Aug. 21, 1962  A. H. LYNCH, SR  3,049,956
STEEL CUTTER SUPPORT GUIDE AND GAUGE
Filed Feb. 16, 1959
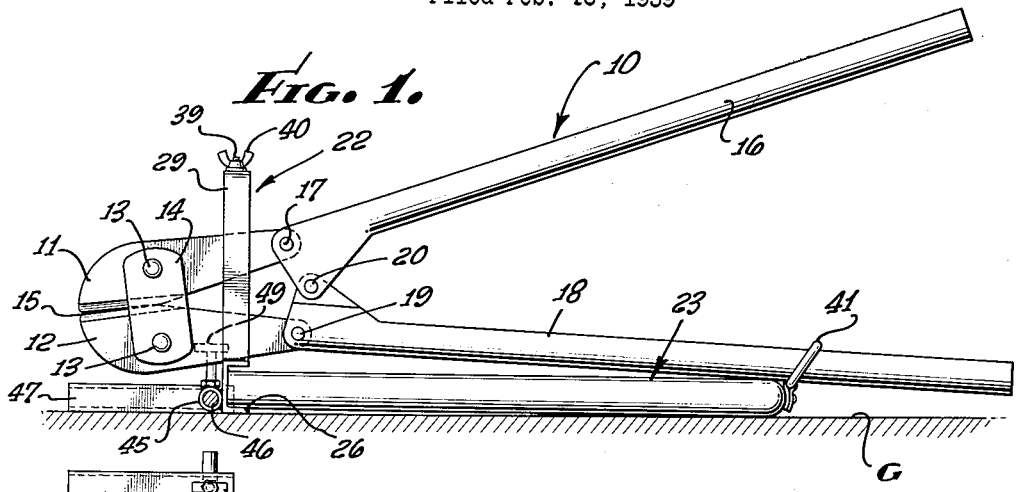
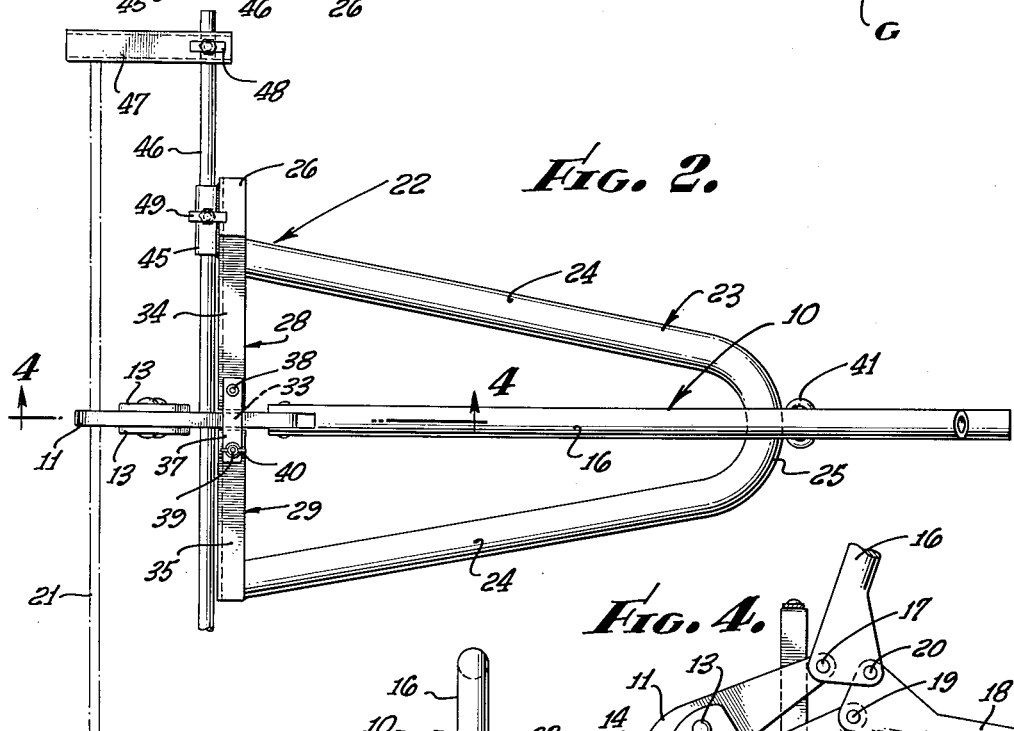
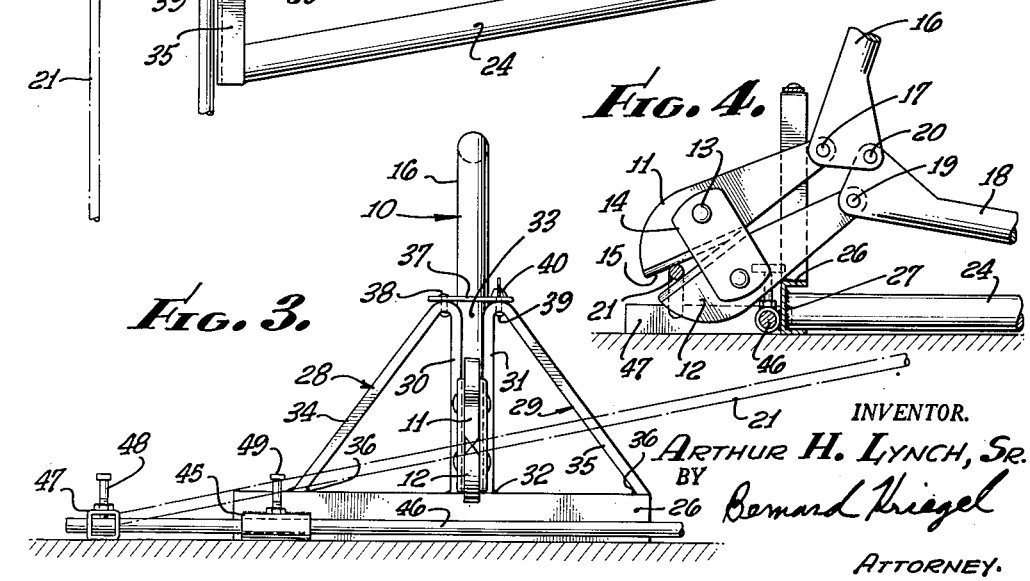
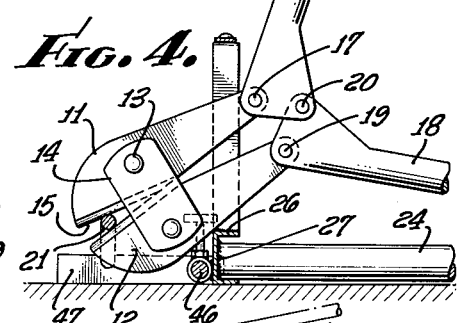
INVENTOR.
ARTHUR H. LYNCH, SR.
BY
Bernard Kriegel
ATTORNEY.

United States Patent Office 3,049,956
Patented Aug. 21, 1962

3,049,956
STEEL CUTTER SUPPORT GUIDE AND GAUGE
Arthur H. Lynch, Sr., 5119 W. 118th St.,
Hawthorne, Calif.
Filed Feb. 16, 1959, Ser. No. 793,460
5 Claims. (Cl. 83—467)

The present invention relates to cutter apparatus, and more particularly to apparatus for cutting or shearing steel rods, bars, and the like, such as reinforcing steel for concrete structures.

An object of the invention is to provide a support for a pair of steel rod cutters that facilitates their manipulation at a job site in shearing or cutting concrete reinforcing steel, and the like, to desired lengths.

Another object of the invention is to provide an apparatus which not only supports a pair of steel rod cutters, but which guides the cutter jaws in their movement to and from the work being cut, canting of the jaws being prevented.

A further object of the invention is to provide an apparatus for supporting and guiding a pair of steel rod cutters which embodies an adjustable gauge for enabling rods and the like to be cut to desired lengths.

This invention possesses many other advantages, and has other objects which may be made more clearly apparent from a consideration of a form in which it may be embodied. This form is shown in the drawings accompanying and forming part of the present specification. It will now be described in detail, for the purpose of illustrating the general principles of the invention; but it is to be understood that such detailed description is not to be taken in a limiting sense, since the scope of the invention is best defined by the appended claims.

Referring to the drawings:

FIGURE 1 is a side elevational view of an apparatus embodying the invention in combination with a pair of rod cutters or shears;

FIG. 2 is a top plan view of the apparatus shown in FIG. 1;

FIG. 3 is a front elevational view of the apparatus;

FIG. 4 is a section taken along the line 4—4, with the jaws of the shears in position for cutting a rod.

A pair of shears, bolt or rod cutters 10 is illustrated in the drawings, which includes opposed cutting jaws 11, 12 that are movable to and from each other by being mounted on hinge pins 13 secured to plates 14 disposed on opposite sides of the jaws. The jaws 11, 12 extend rearwardly from their cutter edges 15, the upper jaw 11 being connected to an upper hand lever 16 by means of a pin 17, and the lower jaw 12 being connected to a lower hand lever 18 by means of a pin 19. The inner portions of the hand levers 16, 18 are pivotally secured together through the agency of a pin 20 passing therethrough.

The rod cutter 10 is manipulated, in a known manner, as by moving the outer ends of the hand levers 16, 18 away from each other, which will effect a rocking of the cutting jaws 11, 12 about their respective hinge pins 13 in a direction away from each other, so that the jaws are then in open position. The work 21, such as a reinforcing rod, is inserted between the jaws 11, 12 at the place to be severed, and the hand levers 16, 18 are then shifted toward one another, which will force the cutting jaws 11, 12 toward one another and against the rod 21 to completely sever the latter.

In using the rod cutters or shears under certain conditions, such as at a construction job site, difficulty is encountered in appropriately manipulating the tool. The rod 21 can be placed between the cutting jaws 11, 12, but in moving the levers 16, 18 toward each other the shears tend to tilt or cant, which makes it difficult to apply the necessary shearing force to the hand levers, as well as making it rather awkward to operate the device. By virtue of the present invention a holder or support, guide and gauge 22 is provided which will facilitate the cutting of the rod 21 to the desired length, and which will enable the shears to be appropriately manipulated by an individual without danger of the cutting jaws 11, 12, or any portions of the shears, canting.

As disclosed, the apparatus 22 includes a base 23 adapted to rest upon the ground G, or other supporting surface. This base includes a pair of divergent arms 24 that are integral with a central portion 25. Thus, the arms and central portion may be made of steel tubing, or the like, with the free ends of the arms 24 secured to a cross member 26, which may be constituted as a length of channel iron, as through the use of welding material 27. The arms 24 diverge sufficiently to impart stability to the base when resting upon the ground or other supporting surface. The base 23 will not tilt or tend to shift from the position in which it is placed.

Extending upwardly from the cross member 26 of the base are a pair of opposed guide members 28, 29 separated from one another by a distance corresponding to but slightly greater than the thickness of the cutting jaws 11, 12 of the shears or rod cutters 10. Specifically, a pair of generally vertical inner legs 30, 31 are secured, as through use of welding material 32, in spaced relation to one another to the central portion of the cross member 26. These legs 30, 31 are supported in rigid fashion, spaced by the appropriate distance from one another to provide the vertical guide slot 33 for the cutter jaws 11, 12, by diagonal outer legs 34, 35 which are integral with the upper ends of the inner legs 30, 31 and which extend downwardly toward the outer ends of the cross member 26 to which they are suitably secured, as through use of welding material 36. Thus, the diagonal outer legs 34, 35 form a rigid support for the upper ends of the inner guide legs 30, 31.

The upper end of the vertical guide slot 33 may be closed by a cover plate 37 pivoted at one end on a pivot pin or bolt 38 passing through the juncture between the inner and outer legs 30, 34, the cover plate extending across the upper end of the guide slot 33 and being releasably secured to the juncture between the other inner leg 31 and outer leg 35 by a bolt 39 passing through a hole in the cover plate, there being a wing nut 40 threaded on the bolt and engaging the cover plate to hold it in appropriate position across the vertical guide slot 33.

By unscrewing the wing nut 40 from the bolt 39 and pulling the bolt downwardly from the plate 37 the latter can be swung clear of the vertical guide slot 33 to enable the rear portions of the cutting jaws 11, 12 to be inserted downwardly in the slot 33, with the lower hand lever 18 engaging the central portion 25 of the base, and with the cutting jaw portions rearwardly of the plates 14 disposed in the vertical slot 33. To prevent lateral shifting of the lower hand lever 18 it may first be inserted through a holding link or ring 41 suitably affixed to the rear end of the central portion 25 of the base, after which the rearward portions of the cutter jaws 11, 12 are slipped downwardly within the vertical guide slot 33 to the position disclosed in FIG. 1. If desired, the cover plate 37 can then be placed across the upper end of the slot 33, the bolt 39 inserted back through the cover plate and the wing nut 40 tightened on the bolt against the plate, which will preclude inadvertent removal of the cutting jaws 11, 12 from the slot 33.

The person operating the apparatus can now rest his foot on the lower hand lever 18, or upon the base 24, and elevate the upper hand lever 16 which will shift the jaws 11, 12 to an open position, the jaws being guided in their vertical movement by the inner legs 30, 31 defining the vertical guide slot 33. The steel rod 21, or other member which is to be severed, is then placed between the open cutting jaws and the rod 21 shifted therewithin until the shearing point is engaged with one of the jaws. The upper hand lever 16 is then moved downwardly toward the lower hand lever 18, the cutting jaws 11, 12 moving against the rod 21 to sever the latter. The upper hand lever 16 can again be raised to re-open the jaws 11, 12 and another rod 21, or other work, inserted therebetween to be sheared by the application of a downward force on the upper hand lever 16. During the time that the shears are being manipulated, the apparatus 22 appropriately supports the shears against canting and appropriately guides the jaws in their movement toward and away from one another. The sides of the slot 33 prevent canting or tilting of the apparatus, insuring that the cutting jaws 11, 12 will engage and sever the rod 21 inserted therebetween at the appropriate shearing point along its length, and further insuring that the force applied to the hand lever is transmitted most effectively to the jaws for the performance of the necessary shearing operation.

When the apparatus need no longer be used, if desired, the shears 10 can be removed from the support 22 by removing the wing nut 40 from the bolt 39 and pulling the latter from the cover plate 37, the plate then being swung to one side to open the upper end of the guide slot 33 and enabling the shears to be lifted therefrom.

Gauge means are provided for predetermining the length of rods or other members to be sheared by the apparatus. Thus, a generally horizontal tubular guide 45 is welded or otherwise suitably secured to the front face of the cross member 26 remote from the vertical guide slot 33 and the jaws 11, 12 of the shears. Extending through this tubular guide is a gauge rod 46 having a gauge 47 releasably clamped to it. This gauge 47 extends normal to the rod 46 or parallel to the jaws 11, 12 of the shears, and may be clamped to the gauge rod by a clamp screw 48 threaded through the gauge 47 and adapted to bear against the gauge rod 46. By loosening the clamp screw 48, the gauge 47 can be shifted along the rod 46 to a desired position. The gauge rod 46 itself is shiftable within the tubular rod 45 to shift the gauge 47 to and from the cutting jaws 11, 12, the gauge rod then being clamped in any desired position by means of a clamp screw 49 threaded in the tubular guide 45 and adapted to bear against the gauge rod.

In the use of the gauge, the clamp screw 49 can be loosened and the gauge rod 46 shifted to place the gauge 47 the appropriate distance from the cutting jaws 11, 12. If a subsequent, relatively small adjustment is needed, the clamp screw 48 holding the gauge to the rod may be loosened and the gauge 47 shifted slightly either to or from the jaws 11, 12 to secure the appropriate spacing of the side of the gauge 47 from the jaws. When the proper distance of the gauge from the jaws has been determined, assurance is had that both clamp screws 48, 49 are tightened, whereupon the end of a rod 21 or other work is placed against the gauge and the rod 21 itself inserted between the cutting jaws 11, 12, the upper hand lever 16 then being moved toward the lower hand lever 18 to sever the rod 21. If a plurality of rods of the same length are to be cut the gauge setting remains at the selected value, and the rods 21 are placed against the gauge 47 and severed to the desired length. At any time that the length of rod 21 to be cut is to be changed, one or both of the clamp screws 48, 49 need merely be loosened, permitting the gauge rod 46 to be shifted or the gauge 47 itself to be shifted along the rod 46 to place the gauge the desired distance from the cutting jaws, whereupon the clamp screws 48, 49 are retightened.

It is, accordingly, apparent that a support, guide and gauge has been provided which will enable an individual to cut comparatively heavy steel rods in a comparatively easy manner. The holding link 41, base 23 and the guide 28, 29 hold the shears 10 in appropriate position. It is only necessary for the operator to move the upper hand lever 16 away from and then toward the lower hand lever 18 to effect the shearing action on the rod 21 or other work placed between the cutting jaws. The cutting jaws and the hand levers move in a single plane and do not cant or cock.

The inventor claims:

1. In combination: a pair of shears having opposed cutting jaws movable to and from each other by a pair of hand levers; a frame including a base adapted to rest upon a supporting surface, said base comprising a pair of divergent arms interconnected at their rearward ends and a cross member secured to the forward ends of said arms; said frame further including a generally vertical guide means comprising at least two vertical inner legs secured to said cross member at their lower ends and spaced from each other to provide a vertical guide slot of sufficient length to freely receive and slidably support simultaneously the jaws of said shears, said slot being of such width as to prevent said jaws from canting, outer diagonal legs secured to the upper ends of said inner legs and to said cross member; and means on said base at the rearward end of said arms adapted to be coupled to one of the hand levers to prevent substantial movement of said one hand lever relative to said base while permitting actuation of said other hand lever.

2. In combination: a pair of shears having opposed cutting jaws movable to and from each other by a pair of hand levers; a frame including a base adapted to rest upon a supporting surface, said base comprising a pair of divergent arms interconnected at their rearward ends and a cross member secured to the forward ends of said arms; said frame further including a generally vertical guide means comprising at least two vertical inner legs secured to said cross member at their lower ends and spaced from each other to provide a vertical guide slot of sufficient length to freely receive and slidably support simultaneously the jaws of said shears, said slot being of such width as to prevent said jaws from canting, outer diagonal legs secured to the upper ends of said inner legs and to said cross member; means on said base at the rearward end of said arms adapted to be coupled to one of the hand levers to prevent substantial movement of said one hand lever relative to said base while permitting actuation of said other hand lever; and removable means secured to said guide means and extending across the upper end of said slot to prevent removal of the shears from said slot.

3. In combination: a pair of shears having opposed cutting jaws movable to and from each other by a pair of hand levers; a frame including a base adapted to rest upon a supporting surface, said base comprising a pair of divergent arms interconnected at their rearward ends and a cross member secured to the forward ends of said arms; said frame further including a generally vertical guide means comprising at least two vertical inner legs secured to said cross member at their lower ends and spaced from each other to provide a vertical guide slot of sufficient length to freely receive and slidably support simultaneously the jaws of said shears, said slot being of such width as to prevent said jaws from canting, outer diagonal legs secured to the upper ends of said inner legs and to said cross member; means on said base at the rearward end of said arms adapted to be coupled to one of the hand levers to prevent substantial movement of said one hand lever relative to said base while permitting actuation of said other hand lever; and adjustable gauge means on said cross member adapted to be shifted to various positions from said guide slot.

4. In combination: a pair of shears having opposed cutting jaws movable to and from each other by a pair of hand levers; a frame including a base adapted to rest upon a supporting surface, said base comprising a pair of divergent arms interconnected at their rearward ends and a cross member secured to the forward ends of said arms; said frame further including a generally vertical guide means comprising at least two vertical inner legs secured to said cross member at their lower ends and spaced from each other to provide a vertical guide slot of sufficient length to freely receive and slidably support simultaneously the jaws of said shears, said slot being of such width as to prevent said jaws from canting, outer diagonal legs secured to the upper ends of said inner legs and to said cross member; means on said base at the rearward end of said arms adapted to be coupled to one of the hand levers to prevent substantial movement of said one hand lever relative to said base while permitting actuation of said other hand lever; a guide secured to said cross member; a gauge rod slidably mounted in said guide; clamp means for securing said gauge rod to said guide; and a gauge secured to and extending from said gauge rod.

5. In combination: a pair of shears having opposed cutting jaws movable to and from each other by a pair of hand levers; a frame including a base adapted to rest upon a supporting surface, said base comprising a pair of divergent arms interconnected at their rearward ends and a cross member secured to the forward ends of said arms; said frame further including a generally vertical guide means comprising at least two vertical inner legs secured to said cross member at their lower ends and spaced from each other to provide a vertical guide slot of sufficient length to freely receive and slidably support simultaneously the jaws of said shears, said slot being of such width as to prevent said jaws from canting, outer diagonal legs secured to the upper ends of said inner legs and to said cross member; means on said base at the rearward end of said arms adapted to be coupled to one of the hand levers to prevent substantial movement of said one hand lever relative to said base while permitting actuation of said other hand lever; a guide secured to said cross member; a gauge rod slidably mounted in said guide; clamp means for securing said gauge rod to said guide; a gauge secured to and extending from said gauge rod, said gauge being slidably mounted on said gauge rod; and a clamp screw threaded in said gauge and adapted to engage said rod for securing said gauge in various positions on said rod.

References Cited in the file of this patent

UNITED STATES PATENTS

| | | |
|---|---|---|
| 146,138 | Merritt | Jan. 6, 1874 |
| 147,850 | Lindsay | Feb. 24, 1874 |
| 171,248 | Stone | Dec. 21, 1875 |
| 176,246 | Schofield | Apr. 18, 1876 |
| 206,781 | Golding | Aug. 6, 1876 |
| 244,789 | Breth | July 26, 1881 |
| 517,706 | Mossop | Apr. 3, 1894 |
| 1,411,785 | Holland | Apr. 4, 1922 |
| 2,086,863 | Geddes | July 13, 1937 |